United States Patent [19]  [11] Patent Number: 4,848,933
Bigo et al.  [45] Date of Patent: Jul. 18, 1989

[54] ROTARY MOUNTING FOR MOUNTING A GEAR WHEEL RELATIVE TO A FRAME

[75] Inventors: Louis Bigo, Compiegne; Marc Perot, Le Plessis Belleville, both of France

[73] Assignee: Poclain Hydraulics, Verberie, France

[21] Appl. No.: 155,556

[22] Filed: Feb. 12, 1988

[30] Foreign Application Priority Data

Feb. 26, 1987 [FR] France ................. 87 02580

[51] Int. Cl.⁴ .................... F16C 35/02; F16C 35/04; F16H 57/02
[52] U.S. Cl. .................. 384/129; 74/421 R; 74/606 R; 384/416; 384/440; 384/543; 384/586
[58] Field of Search .......... 74/740, 421 R, 606 R; 384/396, 129, 416–419, 428, 440, 441, 445, 449, 456, 490, 495, 513, 543, 546, 547, 558, 586, 588, 589

[56] References Cited

U.S. PATENT DOCUMENTS 3,142,195 7/1964 Heayon .
3,763,978 10/1973 Crooks .................. 192/4 A
3,916,712 11/1975 Kelbel et al. ............ 74/410
4,317,386 3/1982 Ida et al. ................ 74/467
4,327,598 5/1982 Yoneda et al. .......... 74/467

FOREIGN PATENT DOCUMENTS 1390934 4/1975 United Kingdom ........ 74/740
2109893 6/1983 United Kingdom .
2160618 12/1985 United Kingdom .
2170293 7/1986 United Kingdom .

Primary Examiner—Thomas R. Hannon
Attorney, Agent, or Firm—Poms, Smith, Lande & Rose

[57] ABSTRACT

A rotary mounting for mounting a gear wheel relative to a frame, the gear wheel being constrained to rotate with a shaft such as a drive shaft, the mounting being constituted by: the gear wheel being mounted at one end of the shaft around the outer periphery thereof; an axial hollow in the end of the shaft opening out into the end transverse face of the shaft; a protuberance fixed to the frame and coaxial with the hollow, the protuberance being contained inside said hollow; and a single rotary bearing disposed between the protuberance and the hollow at the end of the shaft.

4 Claims, 2 Drawing Sheets

ROTARY MOUNTING FOR MOUNTING A GEAR WHEEL RELATIVE TO A FRAME

The invention stems from a desire to improve the structure of the following mounting, known per se, and constituted by a gear wheel driven by a hydraulic motor and mounted for this purpose on the outlet shaft of the motor and meshing with the toothed ring for turning a rotary turret of a hydraulic shovel.

BACKGROUND OF THE INVENTION

In order to take up the forces exerted on the gear wheel in said prior mounting, two rotary bearings are provided between the drive shaft and the frame to which the motor housing is fixed, said bearings being disposed on either side of the zone in which the gear wheel is disposed. This disposition implies, in particular, that a portion of the shaft should extend beyond the gear wheel in the axial direction in order to support one of said two bearings. The first drawback of this configuration lies in its considerable axial extent, together with the corresponding weight and manufacturing costs; there is also a second major drawback: namely the need to provide two rotary bearings.

Preferred embodiments of the invention remedy this state of affairs, not only in the context of the particular mounting from which the present invention stems, but also in a broader context as defined below.

SUMMARY OF THE INVENTION

The present invention provides a rotary mounting for mounting a gear wheel relative to a frame, the gear wheel being constrained to rotate with a shaft such as a drive shaft, the mounting being constituted by:
- said gear wheel which is mounted at one end of the shaft around the outer periphery thereof;
- an axial hollow in the end of said shaft opening out into the end transverse face of the shaft;
- a protuberance fixed to the frame and coaxial with said hollow, said protuberance being contained inside said hollow; and
- a single rotary bearing disposed between said protuberance and said hollow at the end of the shaft.

Advantageously, the following features are preferably also adopted:
- said rotary bearing extends axially substantially between the transverse planes containing the extreme transverse sides of the gear wheel;
- the gear wheel is integrally formed with the end of the shaft; and
- the rotary bearing is a smooth bearing.

BRIEF DESCRIPTION OF THE DRAWINGS

Embodiments of the invention are described by way of example with reference to the accompanying drawings, in which.

MORE DETAILED DESCRIPTION

Figure 1:
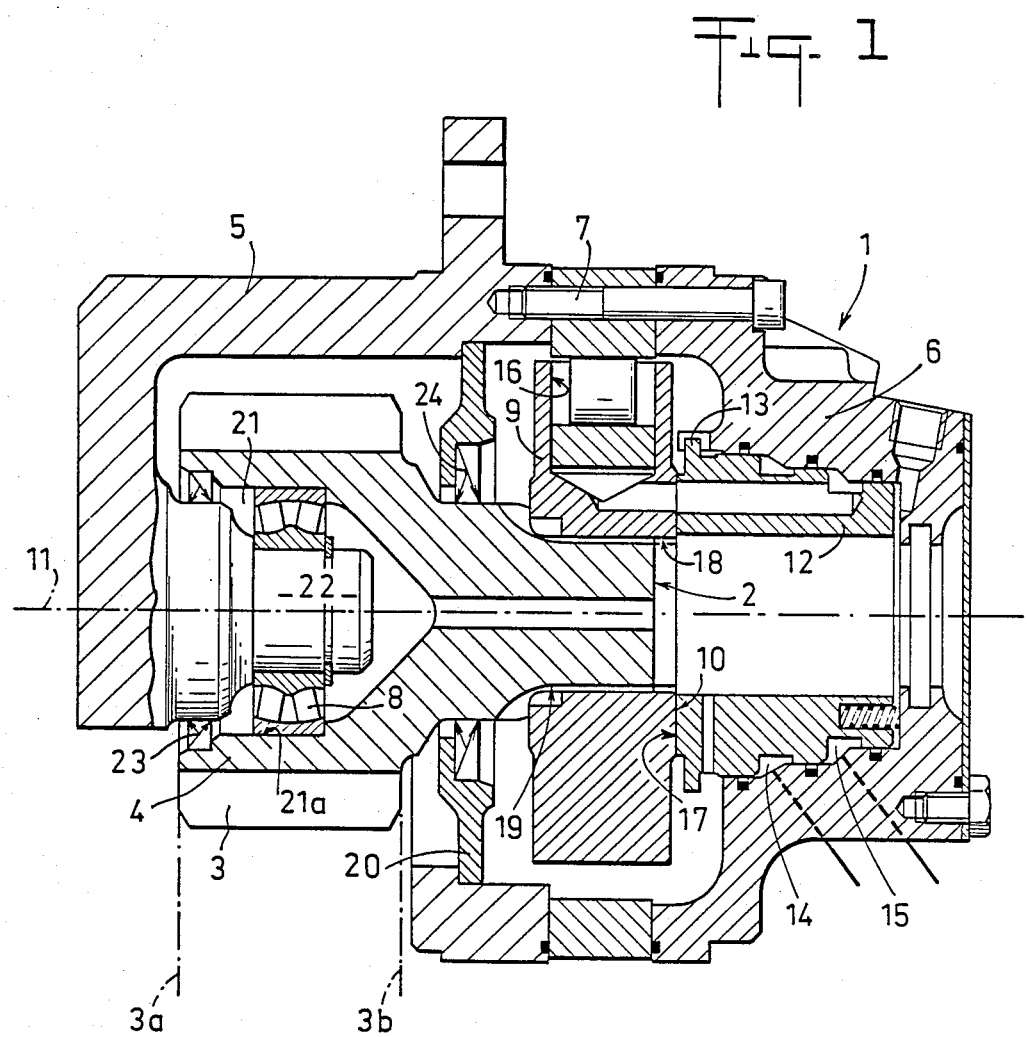
FIG. 1 is an axial section through a first embodiment of the invention.

The assembly shown in FIG. 1 comprises a hydraulic motor 1, the outlet shaft 2 of said motor, a toothed wheel 3 fixed to the outlet shaft 2 and mounted at the end of the shaft which projects out from the motor 1, a bell-shaped frame 5 which is fixed to the casing 6 of the motor by screws 7 and which has an opening providing access to a fraction of the teeth of the gear wheel 3, and a single bearing 8 which is constituted in the FIG. 1 embodiment by a roller bearing.

The hydraulic motor 1 is of a conventional type comprising a cylinder block 9 mounted inside the housing 6 and provided with a plane face 10 extending perpendicularly to its axis of rotation 11 relative to the housing 6, and by a fluid distribution valve 12 which is constrained to rotate (13) with the housing 6 and which includes two chambers 14 and 15, one for feeding fluid under pressure and the other for exhausting fluid without pressure from the cylinders 16 of the cylinder block, and a plane face 17 which bears against the plane face 10 of the cylinder block. The structure and operation of such a motor are sufficiently well known for there to be no need to describe them in greater detail here.

It may be observed that the cylinder block 9 includes a central hollow centered on the axis 11 and provided with fluting 18 that co-operates with fluting 19 provided on the inside end of the shaft 2 in order to ensure that the cylinder block 9 and the motor outlet shaft 2 rotate together.

Beyond the partition 20 which delimits the housing 6 on its outlet shaft side, the shaft 2 flares radially outside the housing so that, firstly, the gear wheel 3 is integral with said flared end 4 of the outlet shaft 2, and secondly a hollow 21 is provided in the central portion of said flared end 4 of the outlet shaft.

Further, the bell-shaped frame 5 partially covers the end 4 of the outlet shaft together with its gear wheel 3, and supports a protuberance 22 which, in the embodiment shown, is integral with the frame, and which is cylindrical in shape, coaxial about the axis 11, and penetrates into and is contained within the hollow 21.

In the FIG. 1 embodiment, a roller bearing 8 is disposed between said protuberance 22 and a cylindrical wall 21a of the hollow 21, thereby providing a rotary mounting for the end 4 of the outlet shaft and its gear wheel 3 relative to the frame 5, with said mounting lying between the planes 3a and 3b of the end transverse faces of the gear wheel 3.

A sealing ring 23 is interposed between the protuberance 22 and the inside wall of the hollow 21 in order to prevent foreign bodies from penetrating into the hollow, and similarly a further sealing ring 24 is interposed between the outlet shaft 2 and the partition 20 to prevent foreign bodies from penetrating into the housing 6.

Figure 2:
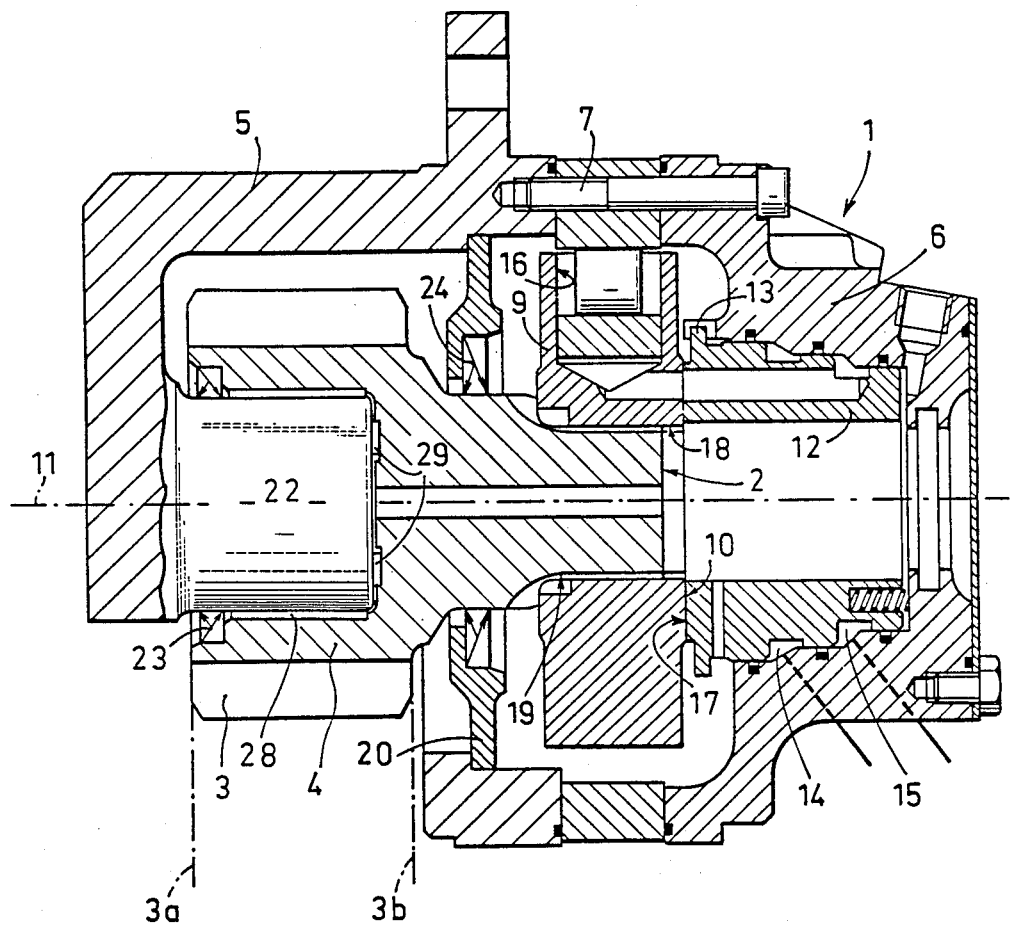
FIG. 2 is an axial section through a second embodiment of the invention.

The embodiment of FIG. 2 is identical to that of FIG. 1 except for the roller bearing 8 which is replaced by a smooth plain bearing 28 which may be smaller in the radial direction, and with axial thrust being taken up by a plane smooth bearing 29 extending perpendicularly to the axis 11.

The advantages of the embodiments described lie in their simplicity and in their compactness: simplicity by virtue of using a single bearing which, since it is situated exactly in the zone occupied by the gear wheel 3 between the planes 3a and 3b of its transverse faces is well placed to take up efficiently the force generated at the gear teeth; and compactness obtained, in particular, by eliminating the length of the outlet shaft which has previously extended beyond the plane 3a.

Making the gear wheel 3 integrally with the end 4 of the outlet shaft is also elegant and strong.

When the rotary bearing is a smooth bearing 28 (FIG. 2), the embodiment is even more compact and advantageous than when the bearing is a roller bearing.

The invention is not limited to the embodiments described, but extends to any variant that falls within the scope of the claims.

We claim:

1. A rotary mounting for mounting a gear wheel relative to a frame, the gear wheel being constrained to rotate with a shaft such as a drive shaft, said shaft extending at least partially inside said frame, the mounting being constituted by:

said gear wheel being mounted on the outer periphery of said shaft;

an appendicular part of the frame, which covers partially said gear wheel and one end of the shaft for being in part disposed opposite the transverse face of said end of the shaft, and a rotary bearing which is disposed between said shaft and said appendicular part of the frame, characterized in that:

(a) the gear wheel is mounted to the said end of the shaft;
(b) said end of the said comprises an axial recess opening into the extreme transverse side of the shaft;
(c) the appendicular part of the frame comprises a protuberance, which is fast therewith, coaxial with said recess and contained inside said recess and which supports the rotary bearing; and
(d) there is only one rotary bearing.

2. A mounting according to claim 1, wherein said rotary bearing extends axially substantially between the transverse planes containing the extreme transverse sides of the gear wheel.

3. A mounting according to claim 1, wherein the gear wheel is integrally formed with the end of the shaft.

4. A mounting according to any preceding claim, wherein the rotary bearing is a plain bearing.

* * * * *